US006198778B1

(12) United States Patent
Mestdagh

(10) Patent No.: US 6,198,778 B1
(45) Date of Patent: *Mar. 6, 2001

(54) METHOD AND DEVICE FOR SETUP OF CLIPPING NOISE OF A MULTICARRIER MODULATION

(75) Inventor: Denis J. G. Mestdagh, Bernin (FR)

(73) Assignee: SGS-Thomson Microelectronics S.A., Gentilly (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/392,713

(22) Filed: Sep. 9, 1999

Related U.S. Application Data

(63) Continuation of application No. 09/001,297, filed on Dec. 31, 1997.

(30) Foreign Application Priority Data

Dec. 31, 1996 (FR) .................................................. 96 16379

(51) Int. Cl.[7] .......................... H04L 25/49; H04L 23/00; H03K 7/00
(52) U.S. Cl. .......................... 375/296; 375/377; 332/107
(58) Field of Search .................................. 375/296, 377, 375/295, 278, 284, 285; 332/106, 107, 108

(56) References Cited

U.S. PATENT DOCUMENTS

| 4,268,855 | 5/1981 | Takahashi | 358/36 |
|---|---|---|---|
| 5,768,318 | 6/1998 | Mestdagh | 375/396 |
| 5,787,113 | 7/1998 | Chow et al. | 375/219 |
| 5,835,536 | 11/1998 | May et al. | 375/316 |
| 6,038,261 | * 3/2000 | Mestdagh | 375/285 |

FOREIGN PATENT DOCUMENTS

| 0942566A2 | * 9/1999 | (EP) | H04L/27/26 |
|---|---|---|---|
| 0957615A2 | * 11/1999 | (EP) | H04L/27/26 |

OTHER PUBLICATIONS

French Search Report from French Patent Application 96 16379, filed Dec. 31, 1996.

Mestdagh, D.J., et al., "Analysis Of Clipping Effect In DMT–Based ADSL Systems" Communications Supercomm, vol. 1, May 1, 1994.

O'Neill R., et al., "Performance of Amplitude Limited Multitone Signals", Proceedings Of The Vehicular Technology Conference, Stockholm, Jun. 8–10, 1994, vol. 3, Jun. 8, 1994, Institute of Electrical and Electronics Engineers, pp 1675–1679.

Wulich: "Peak Factor In Orthogonal Multicarrier Modulation With Variable Levels", Electronics Letters, vol. 32, No. 20, Sep. 26, 1996, pp 1859–1861.

* cited by examiner

Primary Examiner—Stephen Chin
Assistant Examiner—Albert Park
(74) Attorney, Agent, or Firm—Wolf, Greenfield & Sacks, P.C.; James H. Morris; Theodore E. Galanthay

(57) ABSTRACT

The present invention relates to a method for setup of a signal in multicarrier modulation, including clipping the signal, in amplitude, with respect to a threshold value, and of reinjecting, with a delay and on the signal to be set up, a clipping noise redistributed, at least partly, outside the useful slip of the signal in multicarrier modulation.

8 Claims, 3 Drawing Sheets

METHOD AND DEVICE FOR SETUP OF CLIPPING NOISE OF A MULTICARRIER MODULATION

This application of Ser. No. 09/001,297, filed Dec. 31, 1997.

BACKGROUND OF THE INVENTION

1. Field of the Invention

The present invention relates to the field of multicarrier modulation transmissions (DMT: Discrete Multitone Modulator) and, more specifically, to the transmission of signals coded by orthogonal multiplexing in the frequency range (COFDM: Coded Orthogonal Frequency Division Multiplexing).

2. Discussion of the Related Art

The transmission, in multicarrier modulation, of signals coded by orthogonal frequency division multiplexing is a relatively recent technique which is advantageous in many applications with respect to the other conventionally used techniques.

A first application relates to wire communication telephone systems. By using a DMT/COFDM transmission over an asymmetric digital subscriber line (ADSL), very high rate channels are available, in which both voice and digital signals, for example, compressed video signals, can travel. As an example, the rate of such a transmission can be 10 Mbits/s in one direction and 640 kbits/s in the other direction. As a comparison, a modem operating according to standard V34bis which is one of the fastest modems currently used provides a rate of 33.6 kbits/s in both directions.

A second application relates to the audio-digital diffusion from a satellite or from a terrestrial transmitter to a mobile system, for example, a vehicle. The DMT/COFDM transmission here enables, for example, a transmission of information at a rate of about 1.7 Mbits/s.

A third application relates to the terrestrial diffusion of digital television signals (DTTB) for which ⅕ of the capacity of the available frequencies is currently lost due to the necessary overlapping areas between the different transmitters. The implementation of a DMT/COFDM transmission allows a given channel to be transmitted on the same frequency whatever the transmitter.

A DMT signal is formed by superposition of $\underline{n}$ carriers modulated independently from one another. The carriers are modulated, for example, by a quadrature amplitude modulation (QAM) or a frequency shift keying modulation (FSK).

FIG. 1 very schematically shows a conventional example of circuit performing multicarrier modulation.

A stream of data arrives in series on a series-to-parallel (S/P) converter 1, the outputs of which are sent onto a circuit 2 for generating the DMT symbols by means of an inverse fast Fourier transform (IFFT). From a functional point of view, circuit 2 is formed of a QAM or FSK modulator using several carriers f1, f2, ... fn, which provides the modulated carriers to an adder (Σ) 4 superposing the successive samples of these carriers to generate the DMT symbols. Generally, each carrier is associated with a data packet, that is, the data stream is sent in parallel to modulator (MOD) 3 by grouping the data bits into packets of the same size. For example, each carrier is associated with a 3-bit group transmitted in 8-QAM modulation to reproduce the eight possible states of the combination of the 3 data bits. In this example, if 256 carriers are used (n=256), a DMT symbol includes 768 bits, and the transmission rate is 758/T bits/s, where T represents the duration of a DMT symbol.

FIG. 2 illustrates an example of DMT symbol corresponding to the superposition of a sample of all the modulated carriers.

A problem which arises in multicarrier modulation is that adding the samples of modulated carriers can result, randomly, in peaks p of very high amplitude when several modulated carriers superpose in phase. These peaks have significant consequences upon the analog portion of the circuit, especially upon the complexity and the feasibility of digital-to-analog (on the transmit side) and analog-to-digital (on the receive side) converters, the peaks being conventionally likely to reach some twenty volts from peak to peak.

To solve this problem, the digital DMT signal is generally clipped so that its maximum amplitude never exceeds a predetermined value Aclip. Value Aclip is generally chosen according to a threshold of probability of occurrence of a peak for a given application. Indeed, the application of an inverse fast Fourier transform leads to an amplitude distribution having the shape of a Gauss curve schematized on the right-hand side of FIG. 2. Value Aclip is thus generally chosen according to the analog transmission circuit and to the digital-to-analog converter used to respect a certain error rate, that is, a certain probability of clipping of the symbols, in order to minimize signal losses. For example, for a DMT transmission applied to an asymmetrical digital subscriber line, the standards establish a probability which is lower than $10^{-7}$.

The clipping of the digital DMT signal introduces a clipping noise which is detrimental to the performance (signal-to-noise ratio) of the communication system. Especially, the signal-to-noise ratio conditions the possible rate since it conditions the space to be provided, in the phase diagram of each carrier, between two reception points. The better the signal-to-noise ratio, the higher the number of bit combinations contained in a sample of a carrier can be by increasing the length of the bit packets associated with each carrier.

A first conventional solution to improve the signal-to-noise ratio is illustrated in FIG. 3. This solution consists of providing, at the output of IFFT circuit 2, a detector (DETECT) 5 that detects the presence of a clipped DMT and controls a circuit (CODE) 6 of coding back of the concerned data, interposed between series-to-parallel converter 1 and circuit 2. The function of circuit 6 is to modify the coding of the data, according to a law known by the receiver of the sent symbols, to transmit back a DMT symbol, clipped during a first run, as an unclipped symbol. Indeed, a coding modification causes a modification of the phases of the modulated carriers and the probability that a DMT symbol exhibits peaks for two different codings is extremely low.

A disadvantage of such a solution is that it requires storage, upstream of series-to-parallel converter 1, of the data to be transmitted to enable their retransmission if a clipped DMT symbol is detected after coding. Another disadvantage of this solution is that the circuit must transmit, in addition to at least one second DMT symbol if the first one has been clipped, a code for indicating to the receiver the number of runs of a same DMT symbol sent. Further, this solution requires a faster IFFT circuit so that the second possible transformation occurs before the modulation of the following symbol and/or an additional memory so as to keep the symbols upstream of the circuit.

This first solution is described in a paper entitled "A method to reduce the probability of clipping in DMT-based transceivers" by D. Mestdagh and P. Spruyt, in IEEE Transactions on Communications, October 1996, volume 14, number 10, pages 1234–1238.

A second solution consists of modifying the coding, at the input of circuit 2, for the bit combinations which are likely to produce the highest peaks. Indeed, it has been acknowledged that for all combinations, there is a peak amplitude level for the case where the carriers become in phase. Such a solution is described, for example, in a paper entitled "Block coding scheme for reduction of peak to mean envelope power ratio of multicarrier transmission schemes" by A. E. Johns, T. A. Wilkinson and S. K. Barton, in Electronics Letters, December 1994, volume 30, number 25, pages 2098 and 2099, and in a paper entitled "Simple coding scheme to reduce peak factor in QPSK multicarrier modulation", by S. J. Shepherd et al., in Electronics Letters, July 1995, volume 31, no14, pages 1131 and 1132.

If this second solution does not require a double transmission of the same DMT symbol, it still requires transmission of additional bits associated with the coding. Further, this solution requires a high data processing speed to perform the additional coding, and thus a decrease of the energy per bit for the same general transmission power, which results in a degradation of the performance of the communication system in terms of information maintaining capacity. Further, this solution only concerns the DMT signals in which the carriers are FSK-modulated.

SUMMARY OF THE INVENTION

The present invention aims at providing a novel solution for improving the signal-to-noise ratio of a signal transmitted in multicarrier modulation which overcomes the disadvantages of conventional solutions.

The present invention also aims at providing a novel solution which does not reduce the effective rate of the transmission.

The present invention also aims at providing a solution which is independent from the type of modulation used.

To achieve these and other objects, the present invention provides a method for setup of a signal in multicarrier modulation, including the steps of clipping the signal, in amplitude, with respect to a threshold value; and reinjecting, with a delay and on the signal to be set up, a clipping noise redistributed, at least partly, outside the useful slip of the signal in multicarrier modulation.

According to an embodiment of the present invention, the clipping operation is performed on the signal to be set up, after the possible reinjection, on the multicarrier-modulated signal, of a clipping noise corresponding to a former clipping.

According to an embodiment of the present invention, the clipping step includes detecting, in a first replica of the signal to be set up, the possible presence of a peak, the absolute amplitude of which is higher than the threshold value; subtracting, from a second replica of the signal to be set up, the threshold value, to extract therefrom the clipping noise corresponding to a portion of the peak exceeding the threshold value; and subtracting the clipping noise from the signal to be set up, delayed by a time corresponding to the time required to detect the possible presence of a peak plus the time required to extract the clipping noise from the second replica.

According to an embodiment of the present invention, the reinjection step includes redistributing the clipping noise by means of a linear filter; and adding the redistributed noise to the multicarrier modulated signal to be set up.

According to an embodiment of the present invention, the signal to be set up is a digital signal.

According to an embodiment of the present invention, the signal to be set up is an analog signal.

The present invention also aims at a device for setup of a signal in multicarrier modulation, including means for clipping the signal to be set up with respect to a threshold value; means for redistributing, outside the useful slip of the signal in multicarrier modulation, a clipping noise; and means for reinjecting, with a delay and on the signal in multicarrier modulation, a redistributed noise.

According to an embodiment of the present invention, the redistributing means is a linear filter.

According to an embodiment of the present invention, the device includes means for delaying the signal to be set up prior to its clipping by a duration corresponding to the propagation time of a replica of this signal in a detector of peak and in a circuit of extraction of a possible clipping noise.

The foregoing objects, features and advantages of the present invention, will be discussed in detail in the following non-limiting description of specific embodiments in connection with the accompanying drawings.

DETAILED DESCRIPTION

Figure 1:
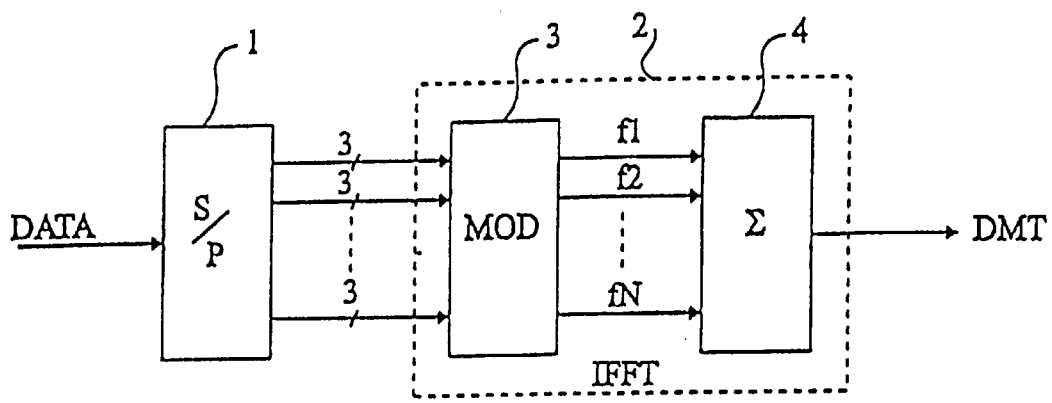
FIG. 1 is a functional block diagram of a conventional circuit for performing multicarrier modulation.
Figure 2:
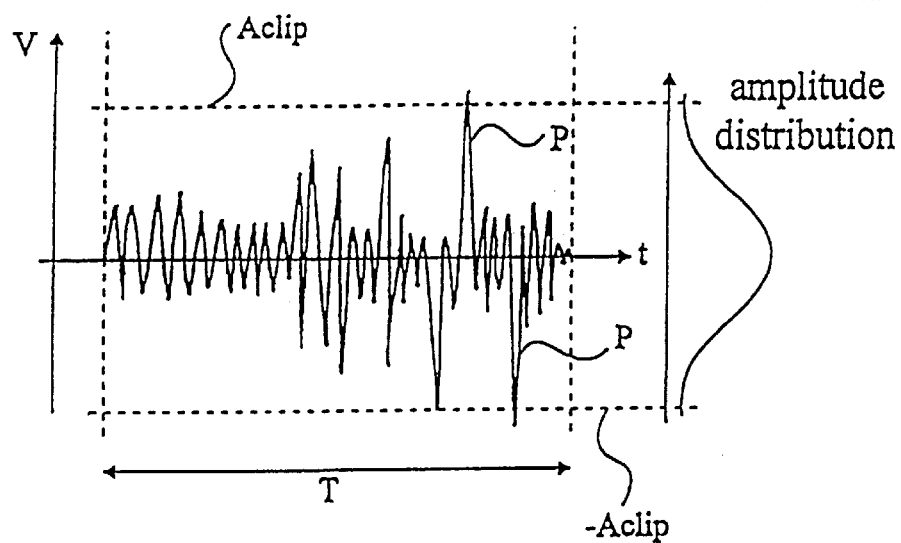
FIG. 2 is a graph of voltage vs. time illustrating an example of a DMT symbol.
Figure 3:
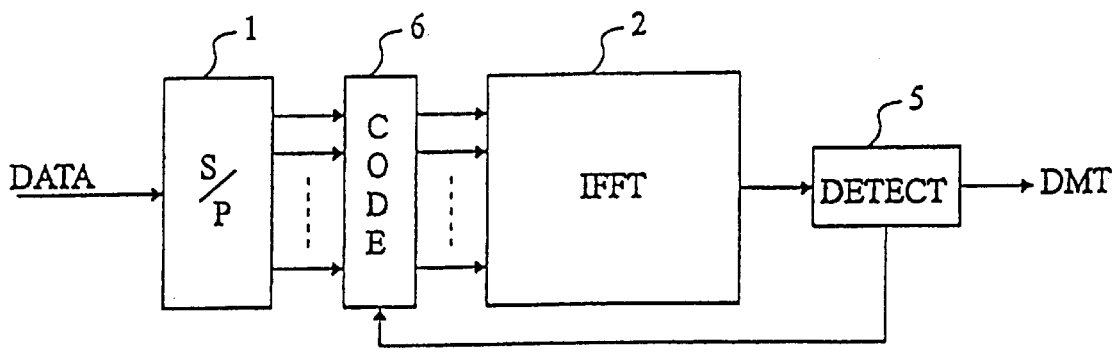
FIG. 3 is a functional block diagram of another conventional circuit for performing multicarrier modulation.

The same elements have been referred to with the same reference numbers in the different drawings. For clarity, only those elements necessary to the understanding of the present invention have been shown in the drawings and will be described hereafter.

A characteristic of the present invention is, conversely to all known solutions which modify the DMT symbols to suppress the occurrence of peaks to be clipped, to transmit clipped symbols.

According to the present invention, the clipping noise is redistributed in a particular way which includes rejecting all or part of this noise outside the useful signal slip, and of reinjecting the redistributed noise on the symbols to be processed. By the noise redistribution, this reinjection the performed with a delay with respect to the clipped peak. Advantage is taken from the fact that the spectral density of clipping noise corresponds to a "white gaussian" noise density (AWGN). This is due to the fact that, in time, the occurrence of clipping noise is random and pulsed. Thus, the spectral density (Fourier transform) of the clipping noise corresponds to a constant.

Figure 4:
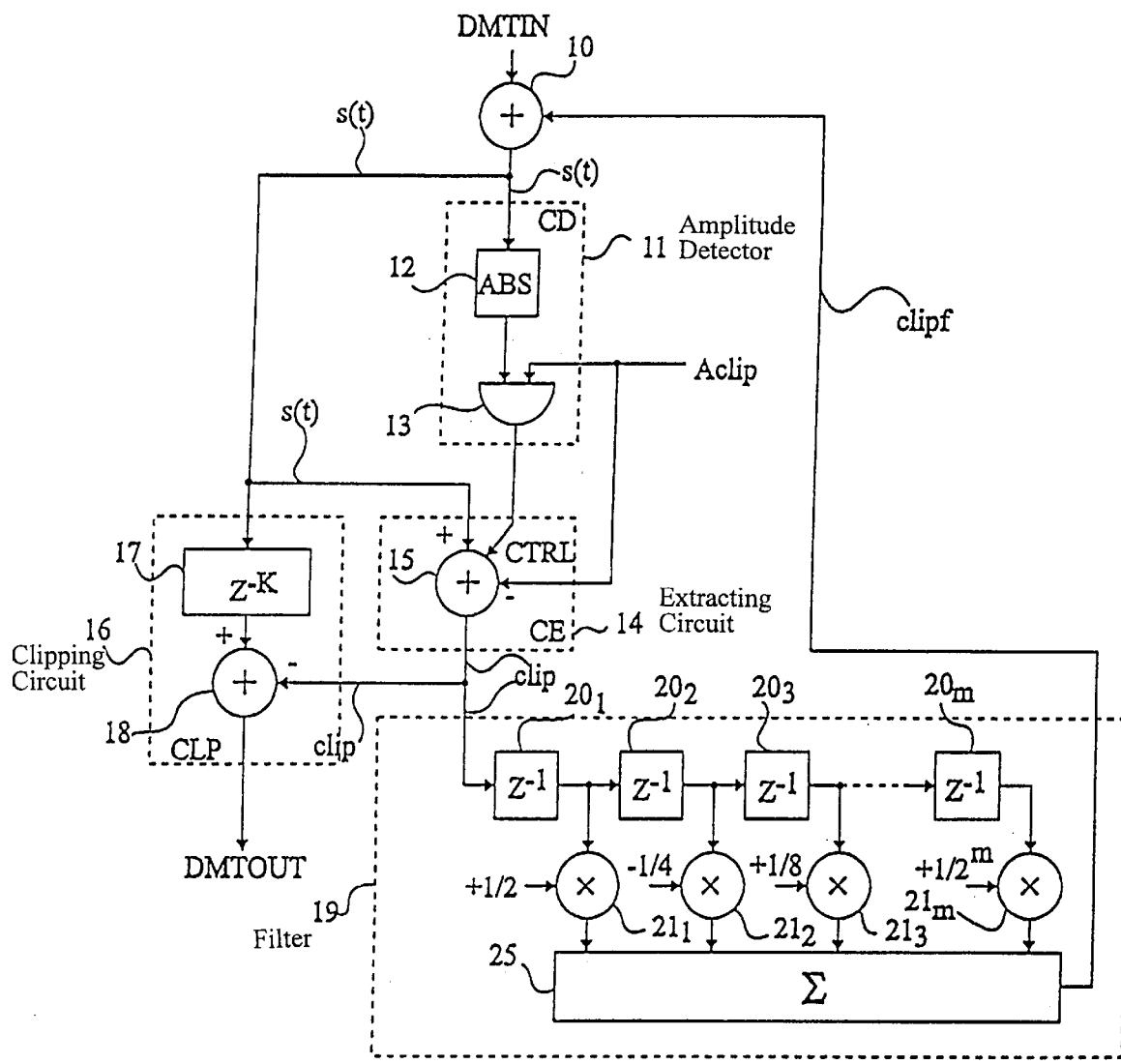
FIG. 4 is a functional block diagram of a signal setup device according to one embodiment of the invention.

FIG. 4 shows, by a functional diagram, an embodiment of a signal setup device according to the present invention. This device is meant to be placed downstream of a circuit (2, FIG. 1) generating DMT symbols by inverse fast Fourier transform.

The digital DMT signals coming from the multicarrier modulation circuit arrive on a first input (DMTin) of an adder 10, a second input of which receives a redistributed noise signal clipf, obtained by the implementation of the present invention as will be seen hereafter. An output of adder 10 provides a signal s(t) which corresponds to signal DMTin to which the possible noise clipf corresponding to the clipping of a peak previously present in signal DMTin is added. Signal s(t) is sent to an amplitude detector (CD) 11. The function of detector 11 is to detect a need for clipping signal s(t) when its absolute amplitude exceeds a threshold value Aclip. Detector 11 includes, for example, an absolute value circuit 12 receiving a replica of signal s(t) and providing the absolute value of this signal. The output of circuit 12 is sent to a first input of a comparator 13, a second input of which receives clipping threshold level Aclip. The output of comparator 13 issues a control signal CTRL to a circuit 14 for extracting the clipping noise from signal s(t). Circuit 14 functionally forms an adder 15, a positive input of which receives a replica of signal s(t), and a negative input of which, receives d.c. signal Aclip. Adder 15 is controlled by state signal CTRL. Circuit 14 issues noise clip extracted from signal s(t). Signal clip is a pulse signal exhibiting a pulse each time signal s(t) is, in absolute amplitude, higher than threshold Aclip.

Signal s(t) and signal clip are sent to a clipping circuit (CLP) 16 which subtracts from signal s(t) noise clip extracted by circuit 14. Circuit 16 includes, functionally, a delaying element 17 ($Z^{-k}$), the function of which is to bring to signal s(t) a delay corresponding to the propagation delay in amplitude threshold detection circuit 11 and noise extraction circuit 14, and an adder 18 receiving the output of element 17 on a positive input and signal clip on a negative input. An output of adder 18 forms output signal DMTout of the setup device according to the present invention.

Signal clip from circuit 14 is also sent on a filter 19, the function of which is, according to the present invention, to redirect noise clip to frequencies located outside the useful slip of signal DMTin. Filter 19 is a conventional filter, and its constitution is perfectly well known. It can be, for example, a finite impulse response digital filter (FIR) formed of several delay elements ($Z^{-1}$) 20 associated in series, each element 20 receiving the output of the preceding element. A first element $20_1$ receives signal clip. The output of element $20_1$ is also sent onto a first multiplier $21_1$ by a factor ½. The output of a second element $20_2$ is also sent onto a second multiplier $21_2$ by a factor -¼. The output of a third element $20_3$ is also sent onto a third multiplier $21_3$ by a factor +⅛. And so on, until an m-th element $20_m$, the output of which is sent onto an m-th multiplier $21_m$ by a coefficient $+½^m$. The outputs of multipliers 21 are sent onto inputs of an adder (Σ) 25, the output of which issues signal clipf sent onto one of the inputs of adder 10.

The transfer function of filter 19 is optimized according to the application. Especially, the filter will have to reduce as much as possible the portion of clipping noise which is located in the slip of the effective signal, or else suppress any clipping noise in the useful slip.

The operation of a signal setup device such as shown in FIG. 4 will be described hereafter in relation with FIGS. 5 to 8. FIGS. 5A, 6A, 7A, 8A show, as a function of time, examples of signals characteristic of the circuit shown in FIG. 4. FIGS. 5B, 6B, 7B and 8B show spectral densities, that is, the respective Fourier transforms of the signals shown in FIGS. 5A, 6A, 7A and 8A.

It is assumed that the device shown in FIG. 4 processes digital samples of signal DMTin. It should however be noted that the circuit of FIG. 4 can be implemented in the form of an analog processing circuit.

Figure 5A:
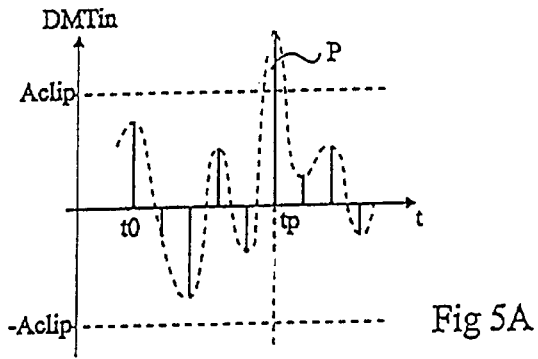
FIG. 5A shows an example of symbol DMTin input in a device according to the present invention.
Figure 5B:
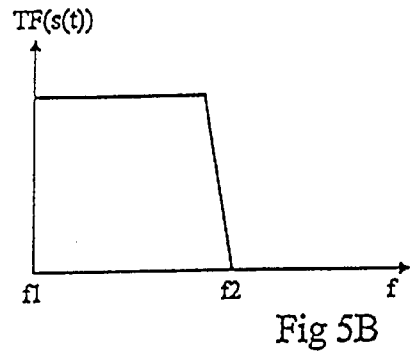
FIG. 5B shows the spectral density of a DMT symbol.

FIG. 5A shows an example of symbol DMTin input in the device according to the present invention. This symbol starts, for example, at a time t0 and, at a time tp, exhibits a peak p, the absolute amplitude of which is higher than threshold Aclip. FIG. 5B shows the spectral density of a DMT symbol. It is assumed that no clipping noise has been redistributed in the DMT symbol of FIG. 5A due to the presence of a peak in a preceding symbol. Thus, signal s(t) corresponds to signal DMTin and its Fourier transform TF[s(t)] contains no other noise than the quantization noise. It is assumed that the useful slip of the signal is between frequencies f1 and f2.

Figure 6A:
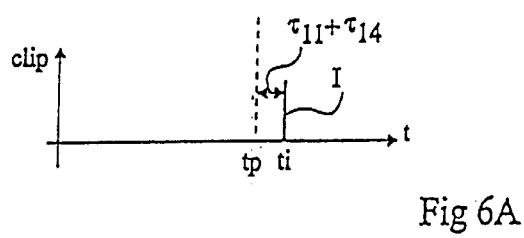
FIGS. 6A, 7A, and 8A show, as a function of time, examples of signals characteristic of the circuit illustrated in FIG. 4.
Figure 6B:
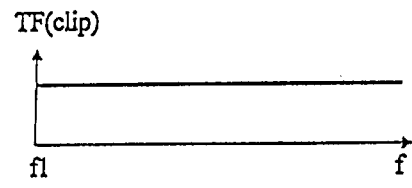
FIGS. 6B, 7B, and 8B show spectral densities of the respective Fourier transforms of the signals shown in FIGS. 6A, 7A, and 8A.

FIG. 6A shows signal clip at the output of circuit 14. This signal exhibits a pulse 1 at a time ti delayed by the respective propagation times $\tau_{11}$ and $\tau_1 4$ in circuits 11 and 14 with respect to time tp. The spectral noise density (TF(clip), FIG. 6B) is constant over the entire frequency range since noises I extracted from signal s(t) have a pulse value of very low reproducibility.

Figure 7A:
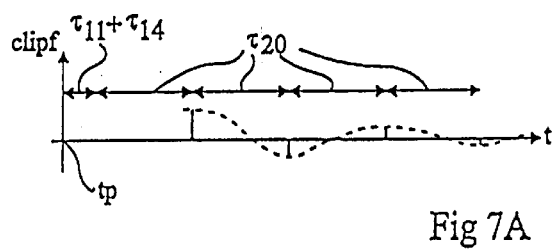
Figure 7B:
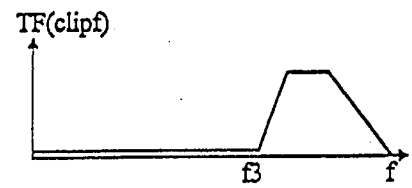
Figure 8A:
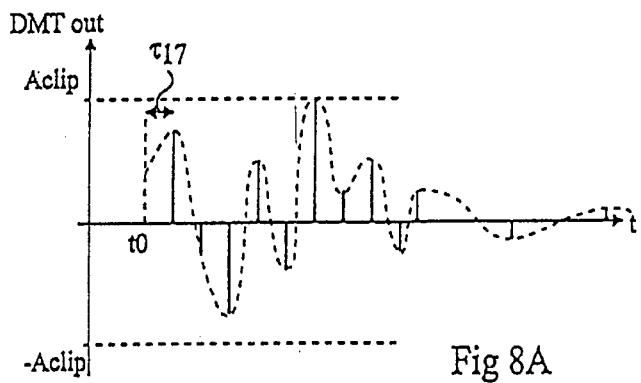
Figure 8B:
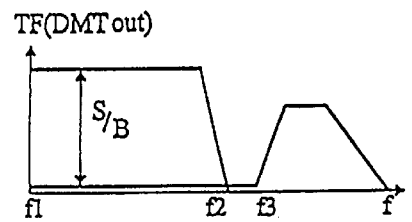

The processing performed by filter 19 on signal clip is illustrated by FIG. 7A which shows signal clipf. The filtering includes redistributing pulse I at regular intervals in the form of a damped signal, which results in shifting its spectral density (TF(clipf), FIG. 7B) towards higher frequencies, for example, starting from a frequency f3 higher than frequency f2.

Noise clipf is thus reinjected (FIG. 8A) on signal s(t) with a delay with respect to peak p now clipped and transmitted. As a result, from a frequency point of view (FIG. 8B), most of the noise is found outside the useful signal slip. Thus, the signal-to-noise ratio (S/B) of output DMTout is considerably improved.

It should be noted that if the total noise input by the present invention exhibits, locally, a greater amplitude than the original clipping noise, this is not disturbing since it is located outside the useful signal slip.

It should also be noted that the noise can be redistributed towards higher and/or lower frequencies, outside the useful signal slip, according to the constitution of filter 19 and the useful frequency slip.

An advantage of the present invention is that it solves the problem of the clipping noise of a DMT signal without acting upon the coding and upon the phases of the DMT symbols in which the high amplitude peaks are present. Thus, the present invention does not require any communication of reference signals to the receptor which decodes all the DMT symbols similarly. Further, the present invention does not require any retransmission of a DMT symbol to be clipped.

According to the application and, especially, to the desired signal-to-noise ratio, threshold Aclip can be decreased by keeping the same performances in terms of signal-to-noise ratio which are, as for them, linked to the required error rate. In this case, the analog portion of the transmission system is considerably simplified.

The same threshold Aclip can also be kept. In this case, the noise setup circuit according to the present invention considerably increases the signal processing performance. The decoding of the modulated carriers is, on the receive side, less polluted by noise. Thus, the present invention decreases the interval, in the amplitude/phase diagram of each carrier, between an ideal reception point and a real reception point. Thus, either the quality of the restituted signal can be improved, or the number of reception points on a same amplitude/phase diagram of a given carrier can be increased, which increases the capacity (rate) of the system.

Of course, the present invention is likely to have various alterations, modifications, and improvements which will readily occur to those skilled in the art. In particular, the practical implementation of a signal setup device according to the present invention such as discussed in relation with FIGS. 4 to 8 is within the abilities of those skilled in the art, be it in analog or digital form.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An apparatus, comprising:
    an adder configured to receive as an input a DMT signal;
    an amplitude detector configured to receive an output of the adder;
    an extractor configured to receive an output of the amplitude detector;
    a clip circuit receiving an output of the extractor and to produce an output a DMT out signal; and
    a filter configured to receive the output of the extractor and to produce a filtered signal for input to the adder.

2. The apparatus of claim 1, wherein said filter comprises means for filtering.

3. The apparatus of claim 1, further comprising:
    a serial to parallel converter; and
    a circuit for generating the DMT signal by performing inverse Fourier transform on the parallel signals.

4. A method of modifying DMT symbols to suppress the occurrence of peaks to be clipped to transmit clipped symbols, comprising:
    obtaining a DMT signal containing a DMT symbol;
    clipping the DMT symbol to generate a clip signal;
    shifting a spectral density of the clip signal; and
    transmitting the clip signal.

5. The method of claim 4, further comprising:
    transmitting DMT signal.

6. The method of claim 5, wherein shifting the spectral density of the clip signal includes shifting the spectral density of the clip signal toward higher frequencies.

7. The method of claim 5, wherein transmitting the DMT signal and transmitting the clip signal occur on the same signal.

8. A method of communicating DMT symbols, comprising:
    obtaining a DMT signal containing a DMT symbol in which high amplitude peaks are present;
    clipping the DMT symbol to generate a clip signal without acting upon coding and phases of the DMT symbol;
    transmitting information associated with the DMT signal and clip signal such that communication of reference signals to a receiver of the transmitted information is not required.

* * * * *